(12) United States Patent
Huang et al.

(10) Patent No.: US 8,594,263 B2
(45) Date of Patent: Nov. 26, 2013

(54) SAMPLING CLOCK SELECTION MODULE OF SERIAL DATA STREAM

(75) Inventors: Ren-Feng Huang, Kaohsiung (TW); Hui Wen Miao, Hsinchu (TW); Ko-Yang Tso, Taipei County (TW); Chin-Chieh Chao, Hsinchu (TW)

(73) Assignee: Raydlum Semiconductor Corporation, Hsinchu County (TW)

( * ) Notice: Subject to any disclaimer, the term of this patent is extended or adjusted under 35 U.S.C. 154(b) by 0 days.

(21) Appl. No.: 13/448,677

(22) Filed: Apr. 17, 2012

(65) Prior Publication Data
US 2012/0269308 A1 Oct. 25, 2012

(30) Foreign Application Priority Data
Apr. 19, 2011 (TW) ................. 100113490 A

(51) Int. Cl.
*H04L 7/00* (2006.01)
(52) U.S. Cl.
USPC ............................ 375/355; 375/326; 327/141

(58) Field of Classification Search
USPC ........... 327/141, 157; 375/224, 326, 355, 371
See application file for complete search history.

(56) References Cited

U.S. PATENT DOCUMENTS

| 2003/0038659 | A1* | 2/2003 | Takahashi et al. | 327/141 |
| 2005/0238126 | A1* | 10/2005 | Ribo et al. | 375/355 |
| 2010/0264963 | A1* | 10/2010 | Kikuchi et al. | 327/157 |

* cited by examiner

*Primary Examiner* — Leon-Viet Nguyen

(57) ABSTRACT

A sampling clock selection module for a serial data stream is disclosed. The sampling clock selection module includes a multi-phase generation circuit, a sampling circuit, a comparison unit and a logic operation unit. The multi-phase generation circuit generates a plurality of non-overlapping clock phases derived from a reference clock signal. The phase selection circuit selects a sampling clock phase under a calibration mode. The sampling circuit performs sampling on the serial data stream a plurality of times to generate a plurality of sampled values in response to the sampling clock phase. The comparison unit compares the sampled values with the serial data stream so as to update a plurality of flag signals. The logic operation unit performs a logic operation on the flag signals so as to select a sampling clock phase under a normal operation mode from the clock phases.

8 Claims, 10 Drawing Sheets

SAMPLING CLOCK SELECTION MODULE OF SERIAL DATA STREAM

BACKGROUND

1. Technical Field

The present invention relates to a sampling clock selection module for a serial data stream.

2. Related Art

When high speed serial data are transmitted, data jitter or phase skew of the data relative to a clock signal will significantly reduce a sampling interval of a valid bit. FIG. 1 is an eye diagram of a typical high speed serial data stream. In FIG. 1, a sampling interval of a valid bit, i.e., an interval where the data bit is stable, is shorter than a width T of the bit. Moreover, if variations in a fabrication process, an operating temperature and a supply voltage of the circuit are taken into consideration, the sampling interval of the valid bit is further reduced, lowering an accuracy of the sampled data bit.

A direct method to solve the foregoing problem is to perform oversampling on the received serial data stream. FIG. 2 is a schematic diagram illustrating a conventional three-times oversampling. The operation of three-times oversampling involves performing sampling on data bits in the serial data stream with a clock having a frequency three times the data bit rate. Next, an exclusive-or (XOR) operation is performed on every two adjacent sampled data states and then calculation is performed by a digital circuit to obtain edge information of the data bit.

However, when the conventional three-times oversampling method is employed, three sampling circuits are required to obtain data states in response to the respective sampling clocks. If a higher accuracy of the sampled data bit is desired, more sampling circuits have to be used, which significantly increase the circuit cost and design complexity.

Therefore, it is highly desirable to provide an improved sampling clock selection module for a serial data stream.

SUMMARY

The present invention discloses a sampling clock selection module for a serial data stream. The serial data stream includes a plurality of bit periods. The sampling clock selection module includes a multi-phase generation circuit, a phase selection circuit, a sampling circuit, a comparison unit and a logic operation unit. The multi-phase generation circuit is configured to generate a plurality of non-overlapping clock phases derived from a reference clock signal. The phase selection circuit is configured to select a sampling clock phase under a calibration mode from the clock phases in response to a phase selection signal. The sampling circuit is configured to perform sampling on the bit periods of the serial data stream a plurality of times to generate a plurality of sampled values in response to the sampling clock phase generated by the phase selection circuit. The comparison unit is configured to compare the sampled values with data bits of the serial data stream so as to update the phase selection signal and a flag signal respective to the sampling clock phase. The logic operation unit is configured to perform a logic operation on a plurality flag signals respective to the sampling clock phases so as to select a sampling clock phase under a normal operation mode from the clock phases.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become easily comprehensible upon reading the following description and upon reference to the accompanying drawings, in which.

DESCRIPTION OF THE EMBODIMENTS

Figure 1:
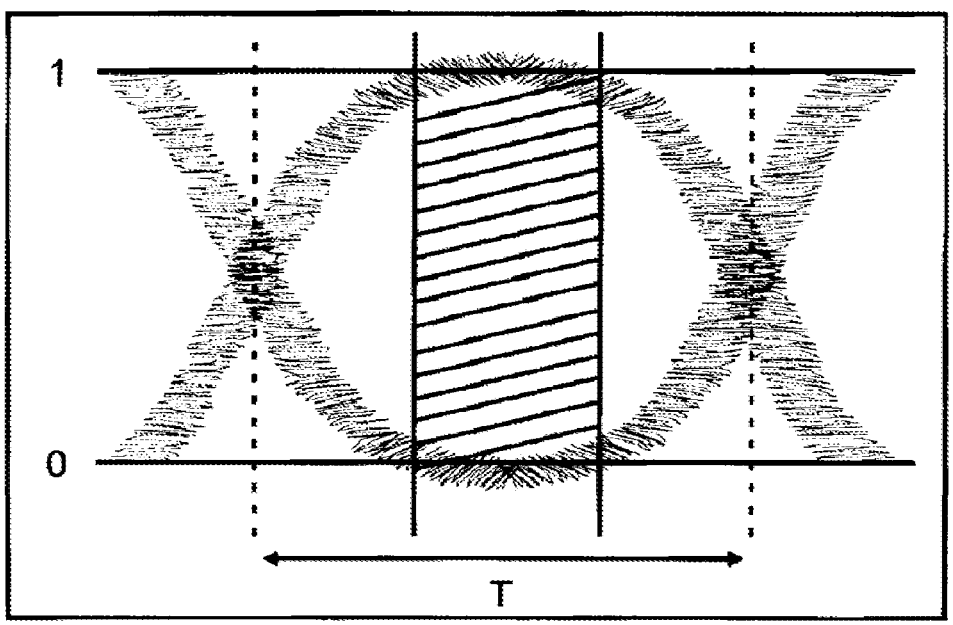
FIG. 1 is a typical eye diagram of a high-speed serial data stream.
Figure 2:
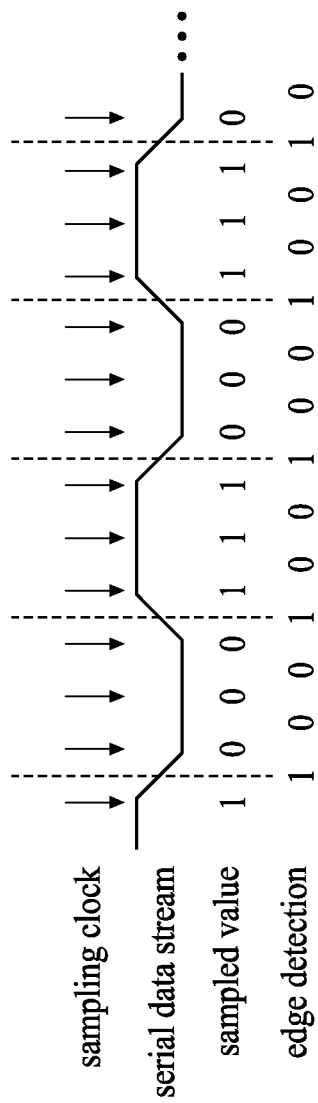
FIG. 2 is a schematic diagram illustrating three-times oversampling.
Figure 3:
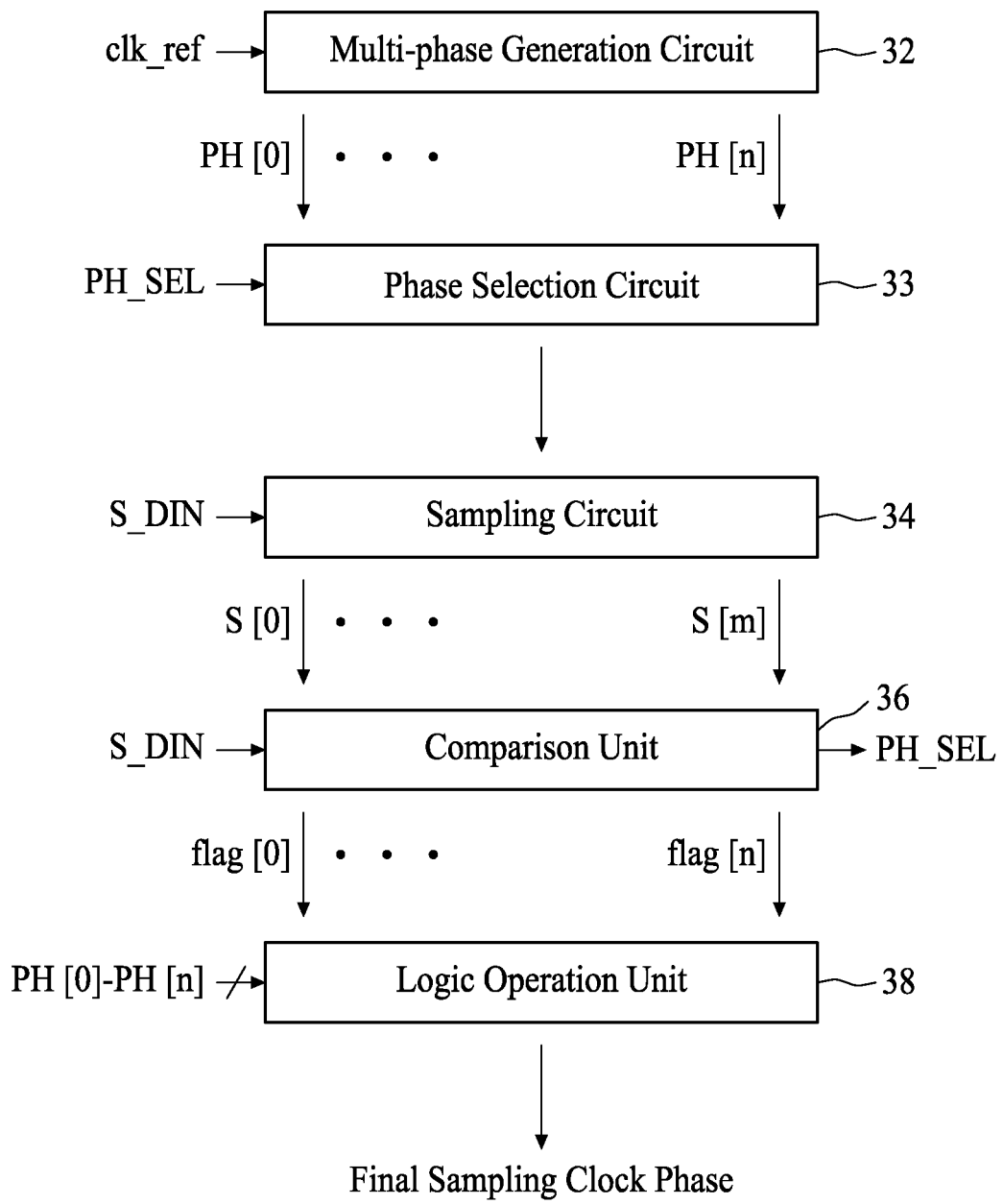
FIG. 3 is a schematic block diagram illustrating a sampling clock selection module according to an embodiment of the present invention.

FIG. 3 is a schematic block diagram illustrating a sampling clock selection module 30 according to an embodiment of the present invention. The sampling clock selection module 30 is configured to provide a better sampling clock for a serial data stream with jitter. The sampling clock selection module 30 can be applied in any data transmission interface, such as a point to point mini-LVDS (Low-Voltage Differential Signaling) interface. In this case, transmission of the serial data stream complies with the point to point mini-LVDS standard. Referring to FIG. 3, the sampling clock selection module 30 includes a multi-phase generation circuit 32, a phase selection circuit 33, a sampling circuit 34, a comparison unit 36 and a logic operation unit 38. The multi-phase generation circuit 32 is configured to generate a plurality of non-overlapping clock phases PH[0] to PH[n] derived from a reference clock signal clk_ref. The phase selection circuit 33 is configured to select a sampling clock under a calibration mode in response to a phase selection signal PH_SEL. The sampling circuit 34 is configured to perform sampling on m bit periods of a serial data stream S_DIN in response to the sampling clock selected by the phase selection circuit 33 to generate a plurality of sampled values S[0] to S[m]. The comparison unit 36 is configured to compare the plurality of sampled values S[0] to S[m] of the sampling circuit with the data bits of the serial data stream S_DIN, so as to update the phase selection signal PH_SEL and a flag signal corresponding to the sampling clock generated by the phase selection circuit 33. The logic operation unit 38 is configured to perform a logic operation on a plurality flag signals flag[0] to flag[n] corresponding respectively to the clock phases PH[0] to PH[n] so as to select a sampling clock phase, i.e., the final sampling clock phase, under a normal operation mode from the clock phases PH[0] to PH[n].

Figure 4:
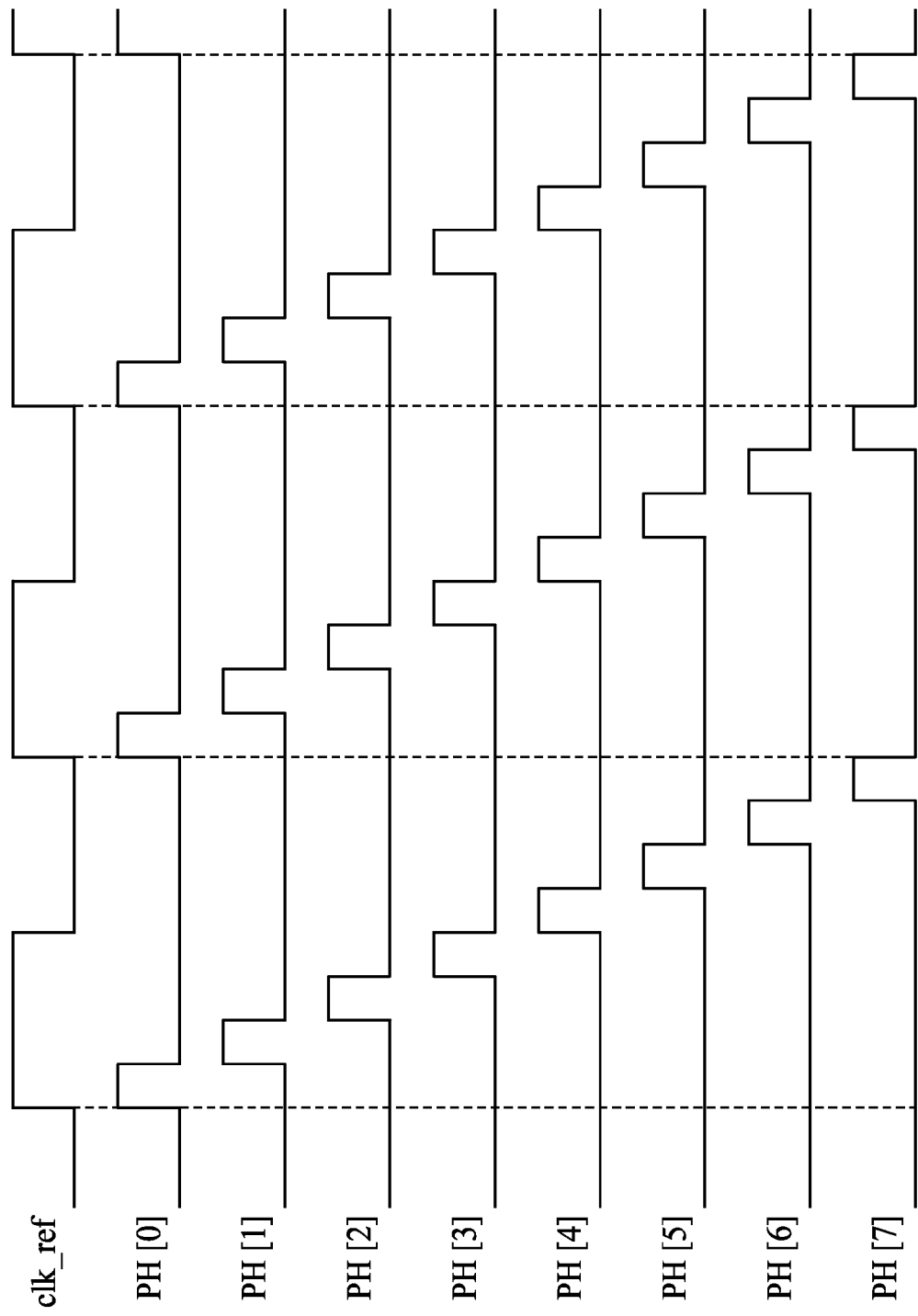
FIG. 4 is a waveform diagram of a multi-phase generation circuit.

The multi-phase generation circuit 32 is designed to generate the plurality of non-overlapping clock phases derived from the reference clock signal clk_ref, wherein each clock phase has a different phase difference with respect to the reference clock signal clk_ref. According to the embodiment illustrated in FIG. 4, 8 non-overlapping phases PH[0] to PH[7] are generated by the multi-phase generation circuit 32. Each phase has a 45° phase difference with respect to the previous phase. The clock phases PH[0] to PH[7] are transmitted to the phase selection circuit 33, which selects the sampling clock phase under the calibration mode from the clock phases PH[0] to PH[7] in response to the phase selection signal PH_SEL.

Figure 5:
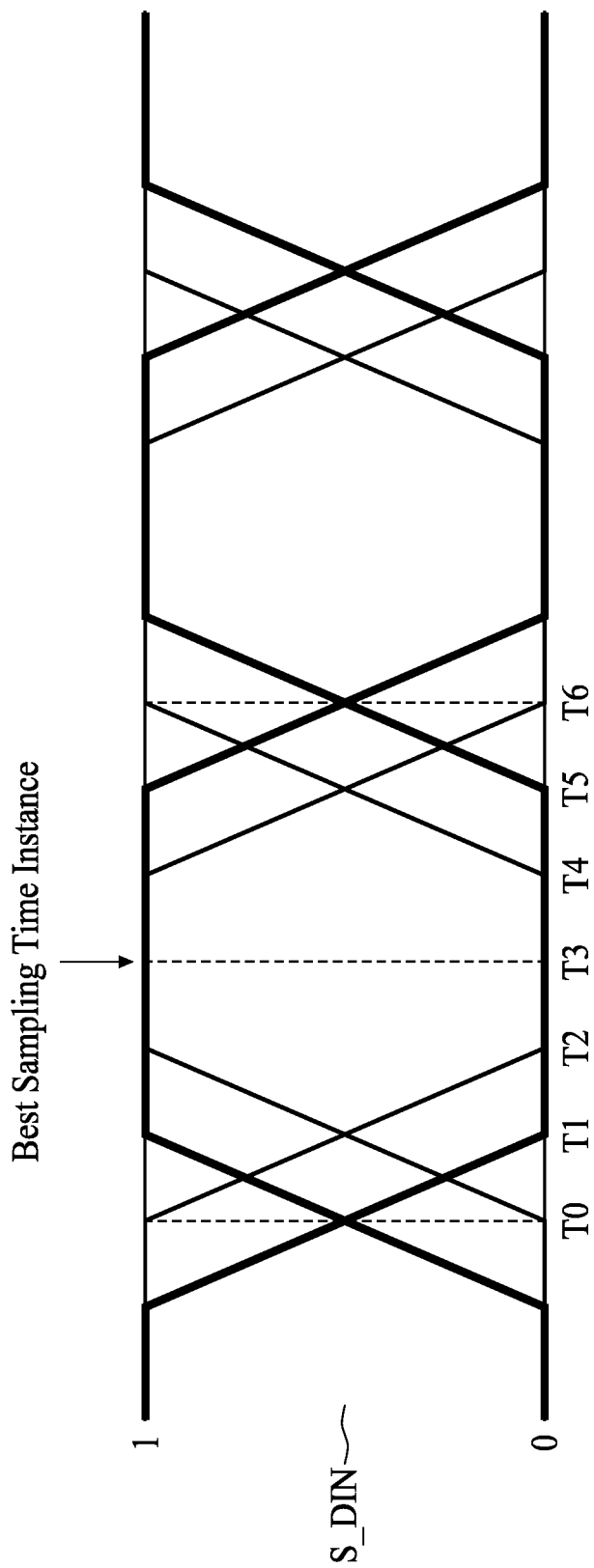
FIG. 5 is an eye diagram of a data signal of a serial data stream according to another embodiment of the present invention.

FIG. 5 is an eye diagram illustrating the serial data stream S_DIN according to an embodiment of the present invention. The eye diagram illustrates overlapping periods (between time T0 and time T6) or a period in which a valid bit can be detected. According to the present embodiment, the serial data stream S_DIN in the calibration mode includes repetitive binary "0" and binary "1". Under the ideal situation, a bit of the data stream S_DIN during the whole bit period, i.e., during the period between time T1 and time T5 at which data transitions happen, is one of binary "0" and binary "1". However, as shown in the eye diagram, jitter, distortion or other issues may cause the time at which data transition happens to be delayed to T2 or advanced to T4, reducing the interval during which the valid bit can be obtained. Since the interval during which the valid bit can be obtained becomes smaller, a better time instance to obtain the data bit according to the present embodiment is the middle point T3 of the data period.

Figure 6:
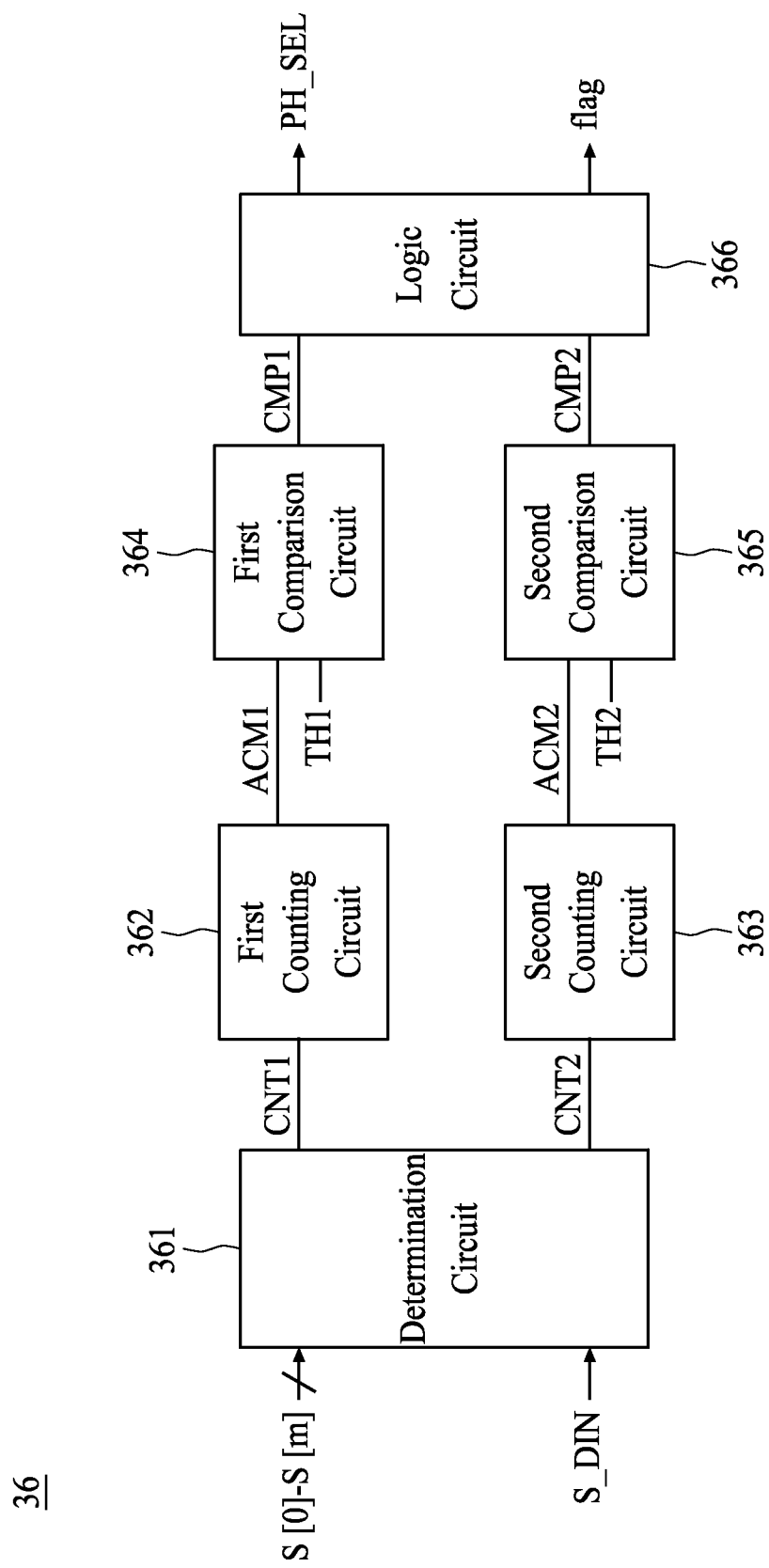
FIG. 6 is a schematic block diagram illustrating a comparison unit according to an embodiment of the present invention.

Since a border of a bit period is easily affected by signal jitter, a bit value sampled at the border is often unstable. Therefore, there exists a need for a mechanism to determine an interval of a valid data bit. FIG. 6 is a schematic block diagram illustrating the comparison unit 36 according to an embodiment of the present invention. The comparison unit 36 includes a determination circuit 361, a first counting circuit 362, a second counting circuit 363, a first comparison circuit 364, a second comparison circuit 365 and a logic circuit 366. The determination circuit 361 is configured to determine if the sampled values S[0] to S[m] of the sampling circuit 34 are different from data bits of the serial data stream S_DIN, so as to generate counting signals CNT1 and CNT2 respectively for the first counting circuit 362 and the second counting circuit 363. The first comparison circuit 364 and the second comparison circuit 365 respectively receives the output signals ACM1 and ACM2 of the first counting circuit 362 and the second counting circuit 363 to generate comparison signals CMP1 and CMP2. The logic circuit 366 updates the flag signal "flag" and the phase selection signal PH_SEL in response to the comparison signals CMP1 and CMP2. The block diagram of the comparison unit 36 as illustrated in FIG. 6 is only an example, and the present invention should not be limited to such example.

Figure 7:
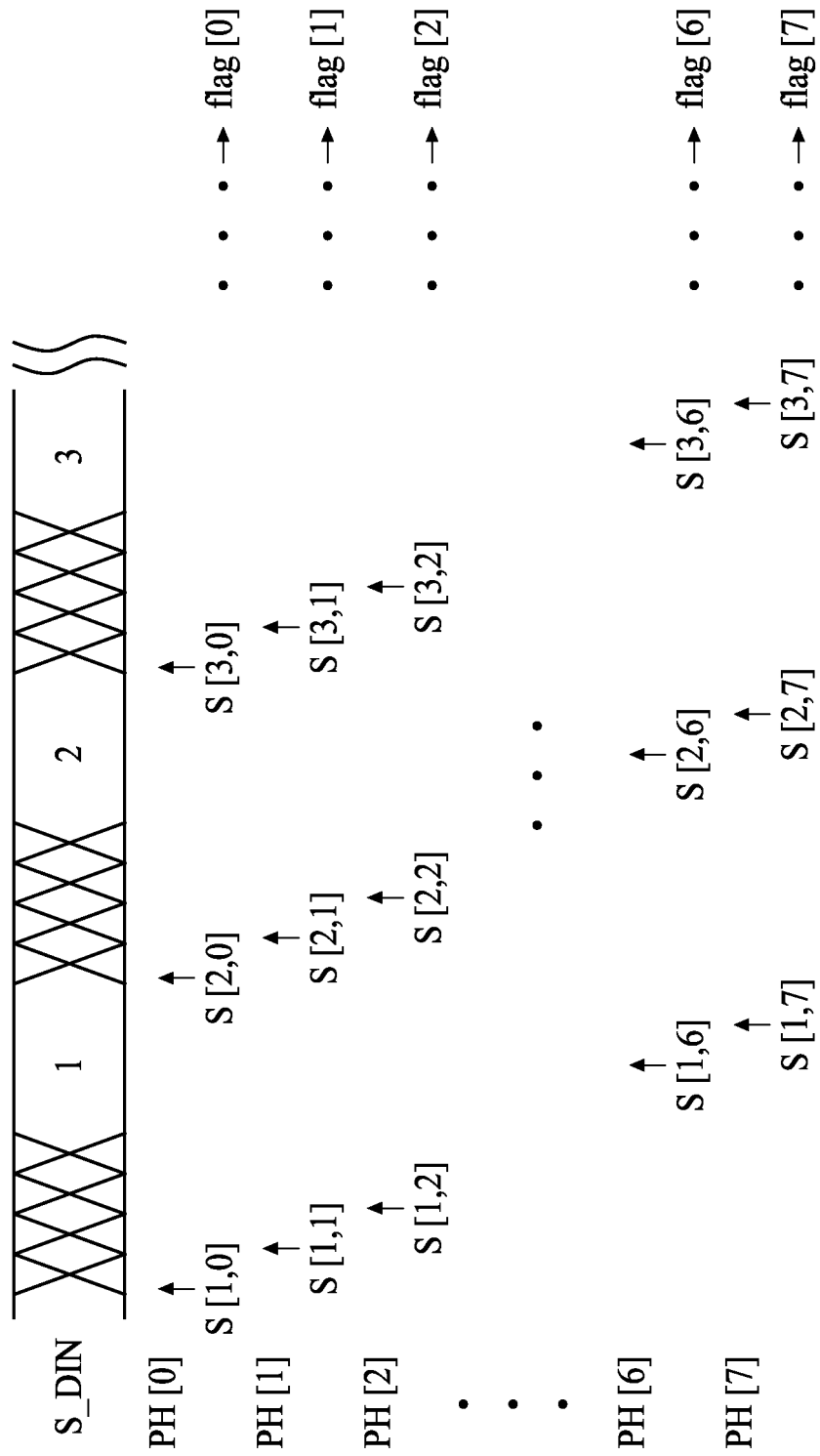
FIG. 7 illustrates a way flag signals are generated according to an embodiment of the present invention.

FIG. 7 illustrates a way the flag signals flag[0] to flag[7] are generated according to an embodiment of the present invention. First, the sampling circuit 34 performs sampling on a first bit period of the serial data stream S_DIN to generate a sampled value S[1,0] in response to a first sampling clock phase, such as PH[0], generated by the phase selection circuit 33. Next, the determination circuit 361 in the comparison unit 36 determine if the sampled value S[1,0] is different from the data bit of the first bit period (which is binary "0" here). If so, the determination circuit 361 generates the counting signal CNT1 for the first counting circuit 362; if not, the determination circuit 361 generates the counting signal CNT2 for the second counting circuit 363. Then, the sampling circuit 34 performs sampling on the m bit periods of the serial data stream S_DIN to generate sampled values S[2,0] to S[m,0] using the clock phase PH[0]. For each sampling operation, the determination circuit 361 determines if the sampled value is different from the data bit of the serial data stream S_DIN, so as to update the counting signals CNT1 and CNT2. The first counting circuit 363 and the second counting circuit 365 accumulate numbers of counting times to respectively generate a first accumulated value ACM1 and a second accumulated value ACM2. When these accumulated values ACM1 and ACM2 respectively exceed thresholds TH1 and TH2, the first and second comparison circuits 364 and 365 respectively output signals CMP1 and CMP2 for the logic circuit 366 to update the flag signal "flag" and the phase selection signal "PH_SEL".

For instance, assuming the threshold TH1 of the first comparison circuit 364 is set as 3 times. When the sampling circuit 34 performs sampling on the serial data stream S_DIN using the clock phase PH[0], if there are 3 sampled values different from the data bits of the serial data stream S_DIN, the first comparison circuit 364 will be enabled to output the signal CMP1, so as to update the phase selection signal PH_SEL, whereby the phase selection circuit 33 outputs the next sampling clock phase PH[1] for the sampling circuit 34. Meanwhile, the flag signal flag[0] corresponding to the clock phase PH[0] is updated as logic low (binary "0"). In another aspect, assuming the threshold TH2 of the second comparison circuit 365 is set as 16 times. When the sampling circuit 34 performs sampling on the serial data stream S_DIN using the clock phase PH[0], if the number of times when the sampled value is the same as the data bit of the serial data stream is accumulated to 16, the second comparison circuit 365 will be enabled to output the signal CMP2, so as to update the phase selection signal PH_SEL, based on which the sampling circuit 34 performs data sampling with the clock phase PH[1]. Meanwhile, the flag signal flag[0] corresponding to the clock phase PH[0] will stay at logic high (binary "1").

When the phase selection circuit 33 selects from the first clock phase PH[0] to the last clock phase PH[7] in sequence in response to the phase selection signal PH_SEL, the sampling circuit 34 and the comparison unit 36 repeat the forgoing steps to update the plurality of flag signals flag[0] to flag[7]. Each flag signal corresponds to a different clock phase. Next, the logic operation unit 38 selects a data sampling clock phase for the data stream S_DIN under a normal operation mode from the clock phases PH[0] to PH[7] in response to the flag signals flag[0] to flag[7].

Figure 8:
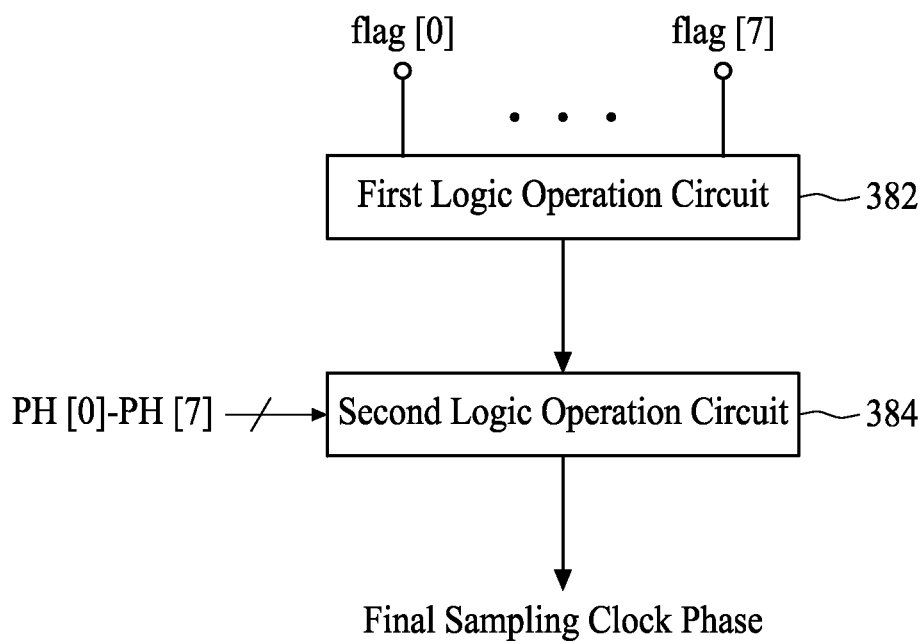
FIG. 8 is a schematic block diagram illustrating a logic operation unit according to an embodiment of the present invention.

FIG. 8 is a schematic block diagram illustrating a logic operation unit 38 according to an embodiment of the present invention. The logic operation unit 38 includes a first logic operation circuit 382 and a second logic operation circuit 384. The first logic operation circuit 382 performs a plurality of logic operations on the flag signals flag[0] to flag[7] to generate a first logic signal and a plurality of second logic signals, wherein a logic level of the first logic signal is different from that of the second logic signals. The second logic operation unit 384 is configured to select one of the clock phases corresponding to the second logic signals in response to the number of logic operations and the first logic signal to generate the final sampling clock phase.

Figure 9:
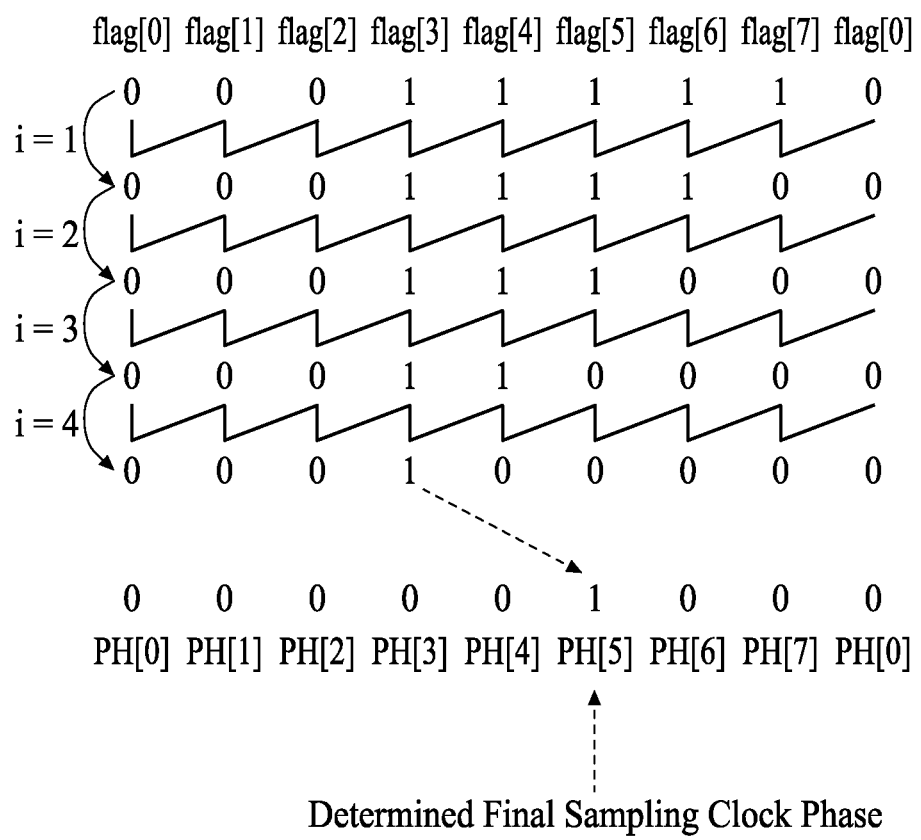
FIG. 9 illustrates a way the logic operation unit operates according to an embodiment of the present invention.

FIG. 9 illustrates a way that the logic operation unit 38 operates according to an embodiment of the present invention. According to the present embodiment, after the first logic operation circuit 382 receives the flag signals flag[0] to flag[7], four logic AND operations are performed to generate one logic "1" signal and a plurality of logic "0" signals. Each logic signal corresponds to a respective clock phase. Then, based on the number of logic operations (which is even), the second logic operation circuit 384 selects the clock phase PH[5] corresponding to the logic "0" signal offset by 2 positions from the logic "1" signal as the final sampling clock phase. Alternatively, according to another embodiment of the present invention, the second logic operation circuit 384 may select the clock phase PH[4] or PH[6] corresponding to the logic "0" signal offset by 1 or 3 positions from the logic "1" signal as the final sampling clock phase.

Figure 10:
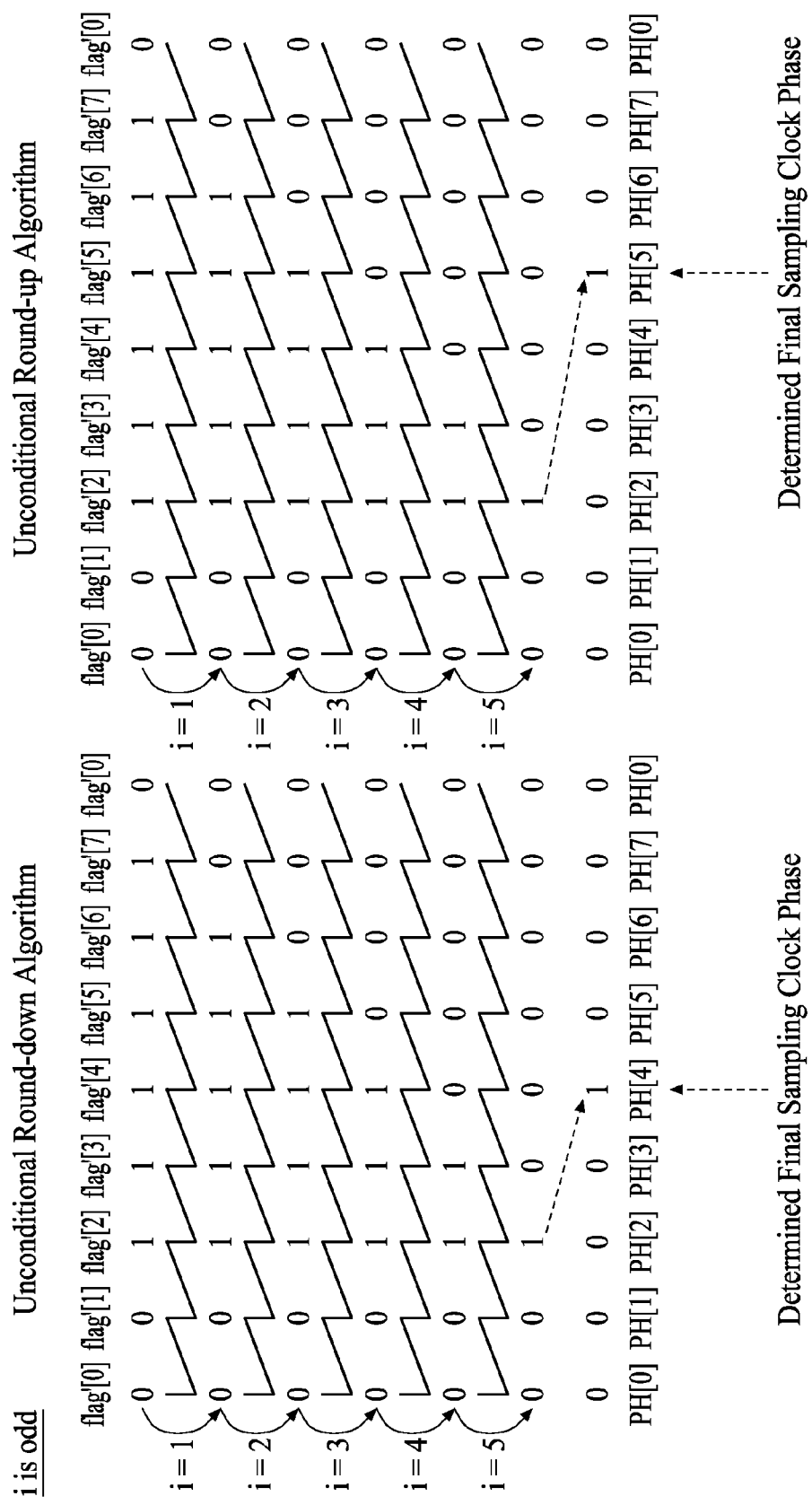
FIG. 10 illustrates a way the logic operation unit operates according to another embodiment of the present invention.

FIG. 10 illustrates a way the logic operation unit 38 operates according to another embodiment of the present invention. According to the present embodiment, after the first logic operation circuit 382 receives the flag signals flag[0] to flag[7], five logic AND operations are performed to generate one logic "1" signal and a plurality of logic "0" signals. Then, based on the number of logic operations (which is odd), the second logic operation circuit 384 selects the clock phase PH[5] corresponding to the logic "0" signal offset by 3 positions from the logic "1" signal as the final sampling clock phase using an unconditional round-up algorithm. When the unconditional round-up algorithm is employed for determining the sampling clock phase, a setup time of the data bits is increased. Alternatively, according to another embodiment of the present invention, based on the number of logic operations (which is odd), the second logic operation circuit 384 selects the clock phase PH[4] corresponding to the logic "0" signal offset by 2 positions from the logic "1" signal as the final sampling clock phase using an unconditional round-down algorithm. When the unconditional round-down algorithm is employed for determining the sampling clock phase, a hold time of the data bits is increased.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A sampling clock selection module for a serial data stream, the serial data stream comprising a plurality of bit periods, the sampling clock selection module comprising:
   a multi-phase generation circuit, configured to generate a plurality of non-overlapping clock phases derived from a reference clock signal;
   a phase selection circuit, configured to select a sampling clock phase under a calibration mode from the clock phases in response to a phase selection signal;
   a sampling circuit, configured to perform sampling on the bit periods of the serial data stream a plurality of times to generate a plurality of sampled values in response to the sampling clock phase generated by the phase selection circuit;
   a comparison unit, configured to compare the sampled values with data bits of the serial data stream so as to update the phase selection signal and a flag signal respective to the sampling clock phase; and
   a logic operation unit, configured to perform a logic operation on a plurality flag signals respective to the sampling clock phases so as to select a sampling clock phase under a normal operation mode from the clock phases;
   wherein the comparison unit comprises:
   a determination circuit, configured to determine if each sampled value of the sampling circuit is different from the corresponding data bit of the serial data stream; if so, a first counting signal is generated for a first counting circuit, and if not, a second counting signal is generated for a second counting circuit;
   the first counting circuit, configured to accumulate a count value in response to the first counting signal to generate a first accumulated value;
   a first comparison circuit, configured to generate a first comparison signal when the first accumulated value exceeds a first threshold;
   the second counting circuit, configured to accumulate a count value in response to the second counting signal to generate a second accumulated value;
   a second comparison circuit, configured to generate a second comparison signal when the second accumulated value exceeds a second threshold; and
   a logic circuit, configured to update the flag signal and the phase selection signal in response to the first and second comparison signals.

2. The sampling clock selection module according to claim 1, wherein the logic operation unit comprises:
   a first logic operation circuit, configured to perform a plurality of logic operations on the plurality of flag signals to generate a first logic signal and a plurality of second logic signals, wherein the first logic signal has a different logic level from that of the second logic signals, and each logic signal corresponds to the respective clock phase; and
   a second logic operation circuit, configured to select one of the clock phases corresponding to the second logic signals based on the number of logic operations and the first logic signal, to generate the sampling clock phase for the normal operation mode.

3. The sampling clock selection module according to claim 2, wherein the logic operations are each an AND operation.

4. The sampling clock selection module according to claim 2, wherein when the number of logic operations is x, and x is even, the clock phase corresponding to the second logic signal offset by x/2 positions from the first logic signal is selected as the sampling clock phase under the normal operation mode.

5. The sampling clock selection module according to claim 2, wherein when the number of logic operations is x, and x is even, the clock phase corresponding to the second logic signal offset by (x/2)+1 or (x/2)−1 positions from the first logic signal is selected as the sampling clock phase under the normal operation mode.

6. The sampling clock selection module according to claim 2, wherein when the number of logic operations is x, and x is odd, the clock phase corresponding to the second logic signal offset by (x−1)/2 positions from the first logic signal is selected as the sampling clock phase under the normal operation mode.

7. The sampling clock selection module according to claim 2, wherein when the number of logic operations is x, and x is odd, the clock phase corresponding to the second logic signal offset by (x+1)/2 positions from the first logic signal is selected as the sampling clock phase under the normal operation mode.

8. The sampling clock selection module according to claim 1, wherein transmission of the serial data stream complies with a point to point mini-LVDS (Low-Voltage Differential Signaling) standard.

* * * * *